United States Patent [19]
Papoi et al.

[11] 3,857,044
[45] Dec. 24, 1974

[54] COMBINATION POWER CONVERTER-DISTRIBUTION PANEL UNIT FOR RECREATIONAL VEHICLES

[75] Inventors: Michael S. Papoi, Kalamazoo; Max E. Barritt, Marshall, both of Mich.

[73] Assignee: Progressive Dynamics, Inc., Marshall, Mich.

[22] Filed: Aug. 2, 1973

[21] Appl. No.: 385,103

[52] U.S. Cl. .................................. 307/9, 317/100
[51] Int. Cl. .......................................... H02b 1/08
[58] Field of Search ........ 307/9, 150, 151; 317/100, 317/99, 120; 174/15 R, 16 R

[56] References Cited
UNITED STATES PATENTS

| | | | |
|---|---|---|---|
| 2,185,562 | 1/1940 | Nielsen | 317/99 X |
| 2,471,011 | 5/1949 | Shapiro | 317/100 |
| 2,542,853 | 2/1951 | Wills | 317/120 |
| 3,200,296 | 8/1965 | Bruestle | 317/100 |
| 3,717,805 | 2/1973 | Gnaedinger | 307/150 |

Primary Examiner—G. Z. Rubinson
Assistant Examiner—Morris Ginsburg
Attorney, Agent, or Firm—Beaman & Beaman

[57] ABSTRACT

A combination electrical distribution and power supply unit for recreational vehicles utilizing both AC and DC circuits wherein distribution apparatus such as circuit breakers, fuses, relays and the like are housed within one chamber of the unit, while the major heat generating components, such as a power converter transformer, are housed in a separate chamber of the unit separately ventilated and cooled. The apparatus is manufactured, shipped and installed as a unit, and includes quick attachment electrical receptacles permitting the unit to be readily connected to the recreational vehicle electrical system. The assembly includes cover plates and a hinged door wherein the unit may be mounted in a wall for access to the distribution components from the vehicle passenger compartment, and the power converter portion of the unit is accessible at the rear of the unit, and is located within the vehicle trunk or other nonoccupied vehicle compartment.

5 Claims, 8 Drawing Figures

Patented Dec. 24, 1974

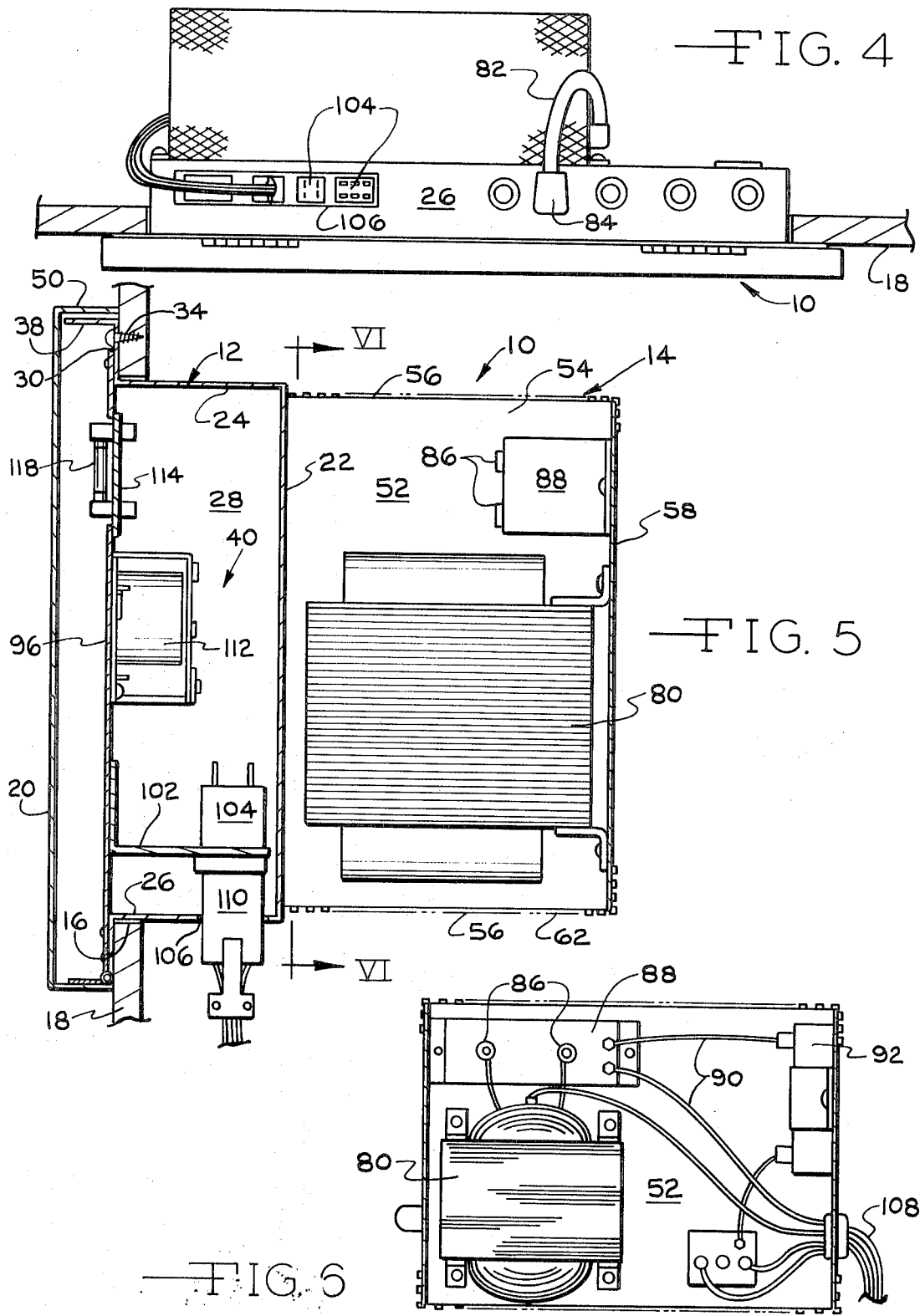

COMBINATION POWER CONVERTER-DISTRIBUTION PANEL UNIT FOR RECREATIONAL VEHICLES

BACKGROUND OF THE INVENTION

The invention pertains to electrical power supply units particularly suitable for use with recreational vehicles utilizing both AC and DC circuits.

The larger and fully equipped recreational vehicles such as travel trailers and motor homes employ 110 volt AC electrical supply circuits for operating heavy duty appliances such as air conditioners, and in recreational vehicles having 110 volt AC generators several of the vehicle appliances may be of the 110 volt AC variety. However, recreational vehicles having 110 volt AC circuits also have low voltage 12 volt DC circuits for permitting lights, and smaller appliances, to be operated from the vehicle battery. Such dual electrical systems provide the necessary versatility to permit usage of the vehicle electrical system regardless of the type of electrical supply available.

In the past, the electrical system for recreational vehicles using dual voltage systems was unorganized and difficult to install and service. The necessary circuit breakers, fuses, relays, electronic circuits, power converter components, and the like, were usually located at different portions of the vehicle complicating installation and servicing, and resulting in high vehicle assembly costs.

Efforts are now being made to centralize electrical systems used in recreational vehicles and U.S. Pat. No. 3,717,805 discloses an example of an electrical power center which permits centralized location of the basic components of a dual voltage system for recreational vehicles.

While the aforementioned patent discloses a power center which overcomes some of the deficiencies of the past practice in the wiring of recreational vehicles for dual voltage circuits, the patented apparatus does not eliminate the source of many servicing problems existing in central power centers resulting from the deterioration of distribution components due to the heat generated by the power converter transformer.

In U.S. Pat. No. 3,717,805 a single chamber cabinet is disclosed in which the AC circuit breakers and DC distribution components are mounted with the power converter step down transformer and associated components. Thus, though ventilating openings are defined in the cabinet, the heat generated by the transformer will be transmitted to the adjacent distribution components resulting in a relatively high temperature environment which accelerates the deterioration of the electric components of the distribution system and significantly increases the likelihood of malfunctioning as compared with components operating under normal temperature conditions.

SUMMARY OF THE INVENTION

It is an object of the invention to provide a combination distribution and power converter unit for recreational vehicles wherein 110 volt alternating current and 12 volt direct current power supplies are made available, and major heat generating components of the unit are sufficiently separated from the distribution components to prevent deleterious effects by the heat generated by such components upon the distribution apparatus.

It is another object of the invention to provide a combination distribution and power converter unit for recreational vehicles wherein the unit may be easily manufactured, assembled and installed, is readily accessible for servicing and maintenance, and is of a configuration readily mountable within the confined quarters of recreational vehicles.

An additional object of the invention is to provide a combination distribution and power converter unit for recreational vehicles which may be mounted within a vertical wall of a recreational vehicle passenger compartment such that distribution apparatus as circuit breakers and fuses is accessible from the interior of the passenger compartment, and the power converter portion of the unit is located within a trunk or other unoccupied vehicle compartment into which the heat of the power converter transformer is dissipated.

In the practice of the invention the unit housing comprises two separate chambers, namely, a distribution chamber and a power converter chamber separated by a vertical partition. The chamber in which the distribution apparatus is mounted is additionally separated into two portions, the AC circuit breakers and associated equipment, such as changeover relays, being located in one portion, and the DC distribution system components being located in the other chamber portion. The distribution chamber portions are enclosed by cover plates disposed toward the vehicle passenger compartment and openings within the AC portion cover plate permit access to the AC circuit breakers. Also, the cover plate disposed over the DC distribution system includes a plurality of fuses or circuit breakers accessible from the passenger compartment. A hinged door encloses the front of the unit, including the cover plates, to provide an attractive appearance hiding the distribution apparatus from view when the door is closed.

The power converter housing portion includes sidewalls depending from the housing partition separating the housing chambers, and such sidewalls include top and bottom walls provided with ventilating openings wherein cooling of the power converter chamber is produced by convection.

Electrical receptacles are mounted within or adjacent sidewalls defining the distribution chamber, and electrical conductors connect the power converter to the circuit breakers by such a receptacle, as well as permit connection of the low voltage output of the power converter to the DC distribution system within the housing distribution chamber, and the DC distribution system is connected to such receptacles permitting the recreational vehicle electrical system to be quickly connected to the unit.

BRIEF DESCRIPTION OF THE DRAWINGS

The aforementioned objects and advantages of the invention will be appreciated from the following description and accompanying drawings wherein:

FIG. 4 is a bottom view of the unit, FIG. 5 is an elevational sectional view taken along section V—V of FIG. 2, FIG. 6 is an elevational, sectional view taken through the power converter chamber along section VI—VI of FIG. 5.

DESCRIPTION OF THE PREFERRED EMBODIMENT

Figure 1:
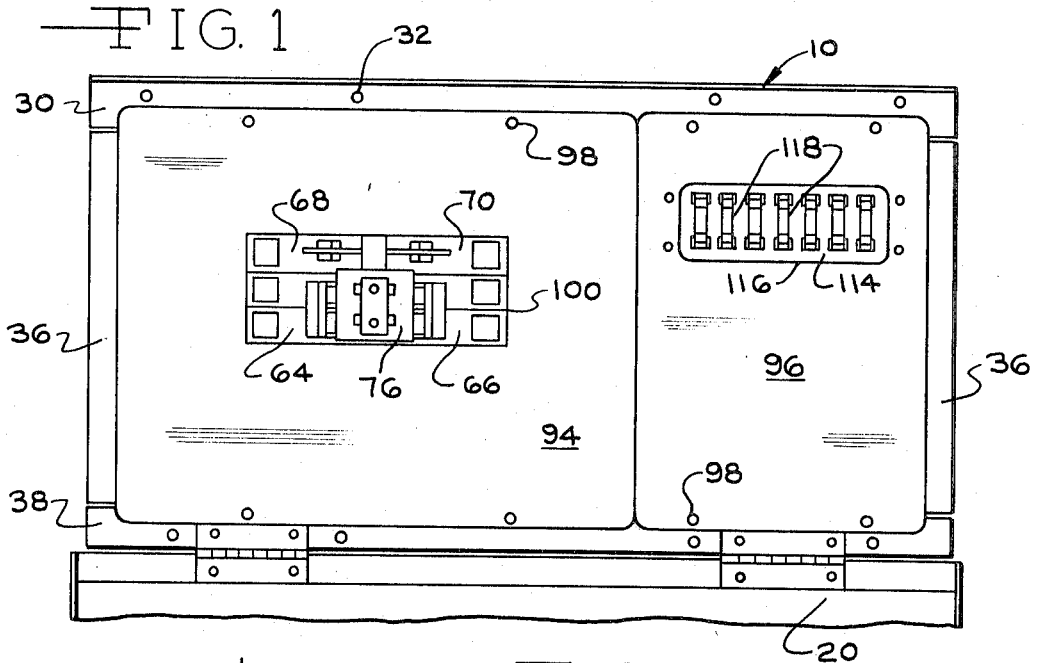
FIG. 1 is a front view of the combination distribution and power converter unit of the invention illustrating the door in the open position.

The combination electrical power distribution panel and power converter unit in accord with the invention includes a sheet metal housing generally indicated at 10. The housing includes an electrical distribution portion 12, and a power converter portion 14, and the details of construction of these portions will be appreciated from the following description.

The housing 10 is adapted to be mounted within a rectangular opening 16 defined within a vertical wall 18 of a recreational vehicle. The portion to the left of the wall 18, FIG. 5, will be the occupied or passenger compartment of the vehicle, while the portion to the right of the wall is normally the trunk of the vehicle, or may be another unoccupied portion of the vehicle such as a storage compartment or the like. The housing 10 is so mounted that its front door 20 extends only slightly into the passenger compartment from the wall 18, and the unit does not occupy significant space within the vehicle passenger compartment.

The distribution and power converter portions are separated by the sheet metal vertical partition 22, and this partition is of a rectangular configuration having integral upper and lower sidewalls 24 and 26, respectively, and attached end sidewalls 28 depending from the plane of the partition in a common direction, and substantially perpendicularly disposed thereto. The sidewalls 24 and 26 terminate in radially outwardly extending flanges 30 in which mounting holes 32 are defined for receiving screws 34, FIG. 5, for mounting the unit within the wall opening 16, and the end sidewalls 28 include flanges 36. The flange 30 of the upper sidewall 24 includes outwardly extending portion 38 defining a periphery for the associated flange. The partition 22 and sidewalls 24, 26 and 28 define a distribution portion chamber generally indicated at 40, and this distribution chamber is separated into an AC circuit breaker portion 42, and a DC distribution system portion 44 by a vertically extending partition 46 extending between the upper and lower sidewalls 24 and 26. As will be appreciated from FIG. 7, the horizontal dimension of the portion 42 is greater than the horizontal dimension of the chamber portion 44.

Figure 7:
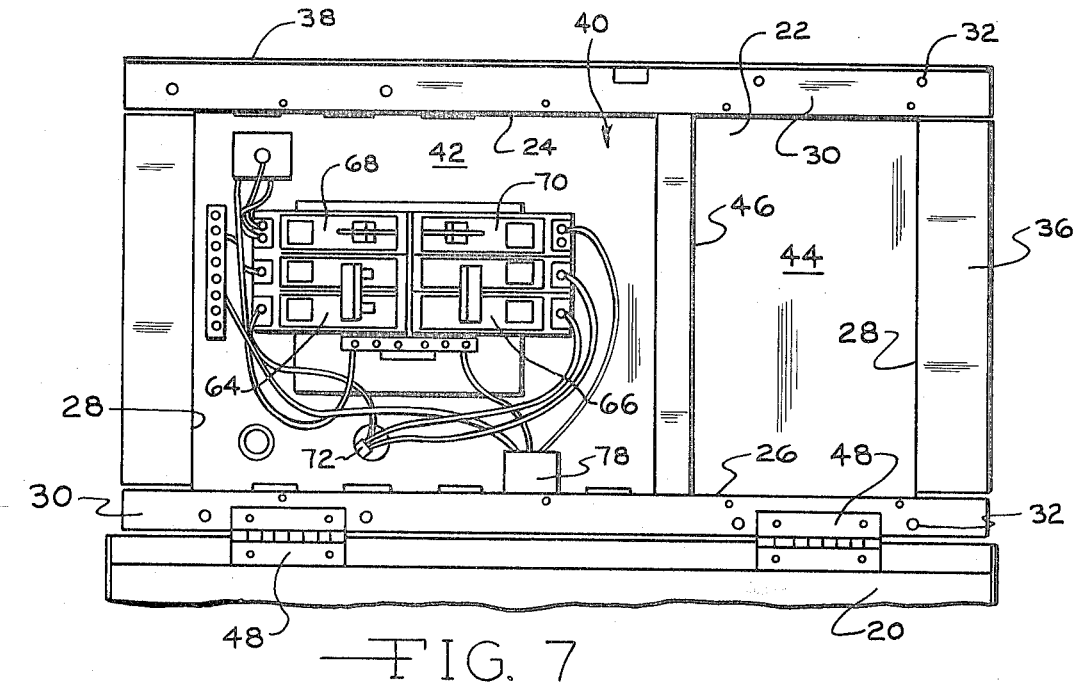
FIG. 7 is a front, elevational view of the unit with the distribution chamber cover plates removed.

The door 20 is hinged at 48 to the flange of lower sidewall 26, FIGS. 1 and 7, and the door includes a peripheral inwardly disposed edge 50 which receives the upper flange portion 38 and the door when closed, completely encloses the sidewall flanges of the portion 12. When the door 20 is fully opened, as shown in FIGS. 1 and 7, the front of the unit is fully accessible from the vehicle passenger compartment.

Figure 2:
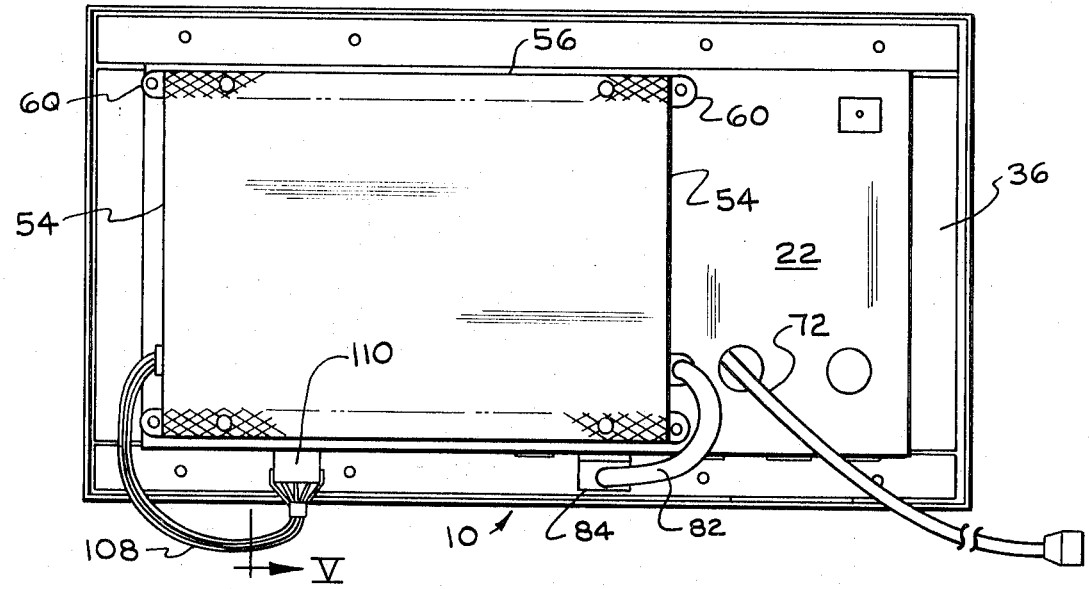
FIG. 2 is a rear elevational view of the unit.
Figure 3:
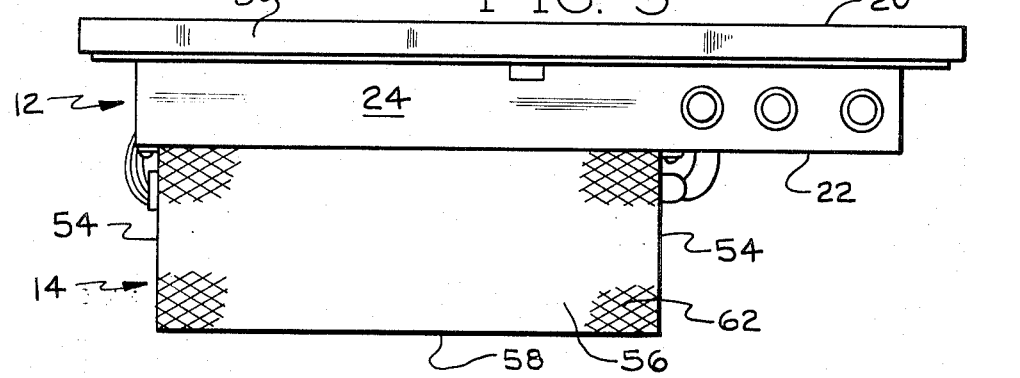
FIG. 3 is a top plan view of the unit in accord with the invention.

The power converter portion chamber 52 of the housing 10 extends rearwardly of the partition 22, to the right as viewed in FIG. 5. The chamber 52 is defined by vertical sidewalls 54 and top and bottom sidewalls 56 extending from the partition 22 substantially perpendicular thereto. The sidewalls are bridged by a rear wall 58 in spaced parallel relation to the partition 22. In a commercial embodiment of the invention the vertical sidewalls 54, and the rear wall 58, are formed of a single piece of sheet metal of U-configuration. The sidewalls 54 include mounting tabs 60, FIG. 2, disposed adjacent the partition 22, whereby the sidewalls 54 are firmly affixed to the partition extending through holes in the tabs by bolts or screws. The top and bottom sidewalls 56 are defined by expanded metal screening 62 which includes a plurality of openings permitting air to enter the power converter chamber for cooling purposes. The screening 62 permits air to flow by convection vertically upward through the power converter chamber 52 to cool the stepdown transformer and other components located therein.

From the foregoing it will be appreciated that the distribution chamber 40, and power converter chamber 52 constitute a unit whereby the unit may be readily inserted within the vehicle wall opening 16 and mounted to wall 18 with a minimum of skill.

The distribution chamber portion 42 houses the 110 volt AC distribution apparatus such as circuit breakers, switches, changeover relays, or the like which are affixed to the partition 22 by screws or rivets. This apparatus, as illustrated, includes main circuit breakers 64 and 66, and secondary double circuit breakers 68 and 70. The main circuit breakers 64 and 66 illustrated are respectively connected to the external 110 volt AC supply as represented by conductor 72, or the 110 volt AC supply from the recreational vehicle auxiliary generator, not shown, the conductors of which are not illustrated.

The secondary AC circuit breakers 68 and 70 are connected to the output of the primary circuit breakers, and are connected to the vehicle 110 volt AC circuits as required. For instance, the secondary circuit breakers are used to protect and supply vehicle air conditioners, refrigerators, and other appliances requiring 110 volt alternating current. Secondary AC circuit breaker 70 is connected to the receptacle 78 mounted in the lower sidewall 26 of the chamber portion 42 for supplying 110 volt AC to the power converter transformer.

The power converter apparatus includes the stepdown transformer 80 having the usual primary and secondary coils, and the transformer includes an AC input conductor 82 having a plug-in 84 which cooperates with the receptacle 78 permitting 110 volt AC to be supplied to the transformer. The output of the power converter transformer 80 is supplied to the rectifying power diodes 86 mounted in a heat sink 88 whereby a 12 volt DC output is provided through conductors 90. The power converter chamber 52 also includes a large resistor 92 used in the circuitry to permit charging of the battery of the recreational vehicle.

In use, the transformer 80, diodes 86 and resistor 92, constitute the primary heat generating components of the unit. Under full load, the transformer generates considerable heat, and the transformer and resistance are cooled by convection as the air flows upwardly through the screened walls 56. As will be noted in FIG. 5, the transformer and heat sink are mounted upon the rear wall 58, and the resistor 92 is mounted upon a sidewall 54. Thus, none of the heat generating components are directly mounted upon the partition 22 in a manner which would cause a direct heating of the partition.

The distribution apparatus chamber portions 42 and 44 are enclosed by cover plates 94 and 96, respectively. The cover plates are mounted upon the housing 10 by screws 98 received within holes defined in the sidewall upper and lower flanges. The cover plate 94 includes an opening 100 through which the outermost portions of the circuit breakers 64–70 extend, such portions including the operating handles and indicia indicating the condition of the circuit breaker. Thus, with the cover plate 94 in place only the necessary operating portions of the circuit breakers will be visible, and it is not possible for the operator to engage any of the terminals or conductors within the chamber portion 42.

The cover plate 94 includes an interlock plate 76 slidably mounted on the cover plate in a horizontal direction. The plate 76 will engage the operating handles of the circuit breakers 64 and 66 and is of such horizontal dimension that the shifting of the operating handle of breaker 66 to the "on" causes the plate 76 to engage the handle of breaker 66 and shift the same to the "off" position, and visa versa. Thus, the circuit breakers 64 and 66 cannot be simultaneously "on" and the vehicle generator circuit is protected from inadvertent connection to the external 110 volt AC power source.

The DC distribution system is located within the chamber portion 44, and in the disclosed embodiment, is mounted upon the inside of the cover plate 96. The DC distribution system includes a bracket 102 mounted upon the cover plate in which a plurality of pin type receptacles 104 are mounted, and these receptacles are in alignment with a relatively large rectangular opening 106 defined in the lower sidewall 26, FIG. 4. Thus, when the cover plate 96 is in position on the housing 10 the receptacles 104 are accessible through the lower opening 106, and the power converter output conductor 108, for instance, may be connected to a receptacle 104 by conductor connector 110, as illustrated in FIG. 5 as may other conductors for supplying the vehicle power distribution system.

The DC distribution system additionally includes an automatic transfer relay 112 which is wired to the DC system such that the relay assumes one condition when direct current is being supplied by the power converter, and assumes its other condition when direct current is being supplied by the recreational vehicle battery, not shown. The operation of the relay is automatic, and the relay protects the low voltage circuit against the possibility of damage in view of the possible two sources of direct current for the DC distribution system.

A dielectric fuse board 114 is mounted upon the cover plate 96, and an opening 116, FIG. 1, defined in the cover plate locates the fuses 118 exteriorly of the chamber portion 44 for ready replacement from the interior of the vehicle. The fuses 118 are connected to the output conductor 120 of the relay 112, and the fuses are also connected to the pin type receptacles 104 for connection to the vehicle DC circuits, which are readily connected to the unit by inserting the vehicle circuit connectors, not shown, through the opening 106 into connection with the receptacles 104. Of course, fuses 118 can be replaced by circuit breakers or other conventional circuit protection devices.

The battery charger circuit board 122 is mounted upon the bracket 102, and the operation of the relay 112 is such that when low voltage is being supplied by the power converter through an exterior power source the recreational vehicle battery will be recharged, insuring maximum availability of vehicle battery power supply.

All of the wiring of the unit is not illustrated in all of the figures for purpose of illustration. However, as apparent in FIG. 8, conductors 124 supply the relay 112 from the vehicle battery or the power converter conductor 108, and the DC circuit conductors 126 connect the fuses 118 to receptacles 104.

Figure 8:
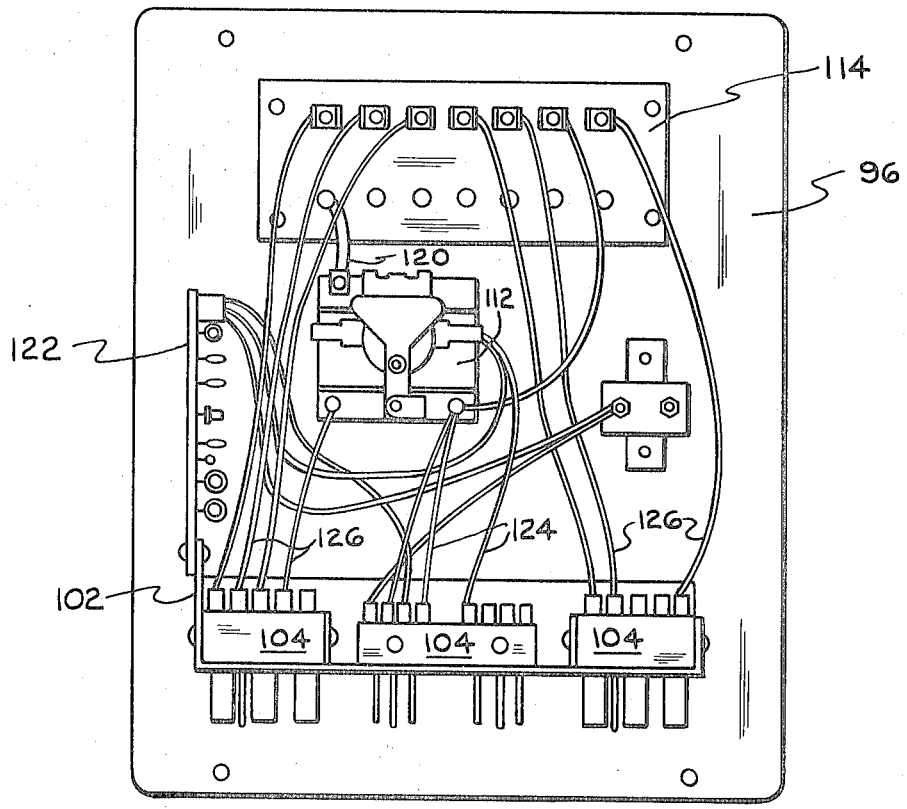
FIG. 8 is an elevational view of the rear side of the DC distribution system cover plate.

The mounting of the DC distribution system on the cover plate 96 permits excellent accessibility to the components of the system when the cover plate is removed, as will be appreciated from FIG. 8, and by using the pin type receptacles 104 the DC distribution system may be readily disconnected from its circuits permitting removal of the cover plate.

From the foregoing description it will be appreciated that the distribution components mounted within the chamber portions 42 and 44 are not subjected to high temperatures. The circuit breaker components within portion 42, and the relay and battery charger components within portion 44 create minimal heat, and no deterioration of these components from such heat will occur. The components within the power converter chamber 52 are effectively cooled by the convection flow through the chamber, and as the flow of heat through the chamber 52 is upwardly, very little heat transfer through the partition 22 into the distribution chamber 40 occurs. Accordingly, the distribution panel and power converter of the invention permits centralized installation of the basic electrical components of recreational vehicles, yet minimizes deleterious effects arising from the unitizing of distribution and heat generating components.

It is appreciated that modifications to the inventive concept may be apparent to those skilled in the art without departing from the spirit and scope of the invention.

We claim:

1. A combination distribution panel and power converter unit for recreational vehicles including AC and DC distribution circuits and power converter apparatus characterized by the ability of the unit to separate heat generating components from distribution components and permit access to the distribution circuits from within the vehicle interior and provide access to the power converter apparatus exteriorly from the vehicle interior comprising, in combination, a housing including a distribution portion and a power converter portion, said distribution portion including a primary partition, front extending sidewalls depending from said partition having flanged edges for mounting said housing within a vertical wall, said partition and sidewalls defining an electrical distribution apparatus receiving chamber, an AC circuit breaker mounted within said chamber having input terminals and output terminals, a DC distribution system within said chamber spaced from said circuit breaker having a supply conductor nd output conductors, receptacles mounted on said housing distribution portion respectively connected to said output terminals and said supply and ouput conductors, said power converter portion including rear extending sidewalls extending from said primary partition in the opposite direction therefrom with respect to said front extending sidewalls, a rear wall interconnecting said rear extending sidewalls in spaced relationship to said partition wherein said partition, rear extending sidewalls and rear wall define a power converter receiving chamber, a voltage reducing power converter transformer circuit within said power converter receiving chamber having a DC low voltage output, an electrical conductor connecting said low voltage output to said receptacles connected to said DC distribution system supply conductor, cover plate means mounted on said flanged edges disposed over said electrical distribution apparatus receiving chamber, an opening defined in said cover plate means providing access to said AC circuit breaker, and a door mounted upon said housing adjacent said flanged edges positional between open and closed positions selectively providing access to said housing distribution portion.

2. In a combination distribution panel and power converter unit as in claim 1, a secondary partition defined in said electrical distribution apparatus receiving chamber dividing said chamber into first and second chamber portions, said AC circuit breaker being located within said first chamber portion and said DC distribution system being located within said second chamber portion.

3. In a combination distribution panel and power converter unit as in claim 2, a first cover plate mounted on said flanged edges disposed over and enclosing said first chamber portion, an opening defined in said first cover plate, said AC circuit breaker being accessible through said opening, and a second cover plate mounted on said flanged edges disposed over and enclosing said second chamber portion, said DC distribution system being mounted upon said second cover plate.

4. In a combination distribution panel and power converter unit as in claim 3 wherein said second cover plate includes a bracket, said receptacles being mounted on said bracket, conductors connecting said DC distribution system to said receptacles, and an opening defined in a front extending sidewall in alignment with said receptacles permitting access to said receptacles when said second cover plate is enclosing said second chamber portion.

5. In a combination distribution panel and power converter unit as in claim 1, wherein said rear extending sidewalls include a bottom sidewall and a top sidewall vertically disposed above said bottom sidewall, and ventilation openings defined in said top and bottom sidewalls.

* * * * *